No. 816,129. PATENTED MAR. 27, 1906.
A. E. SCOUTEN.
COUPLING DEVICE.
APPLICATION FILED APR. 29, 1905.
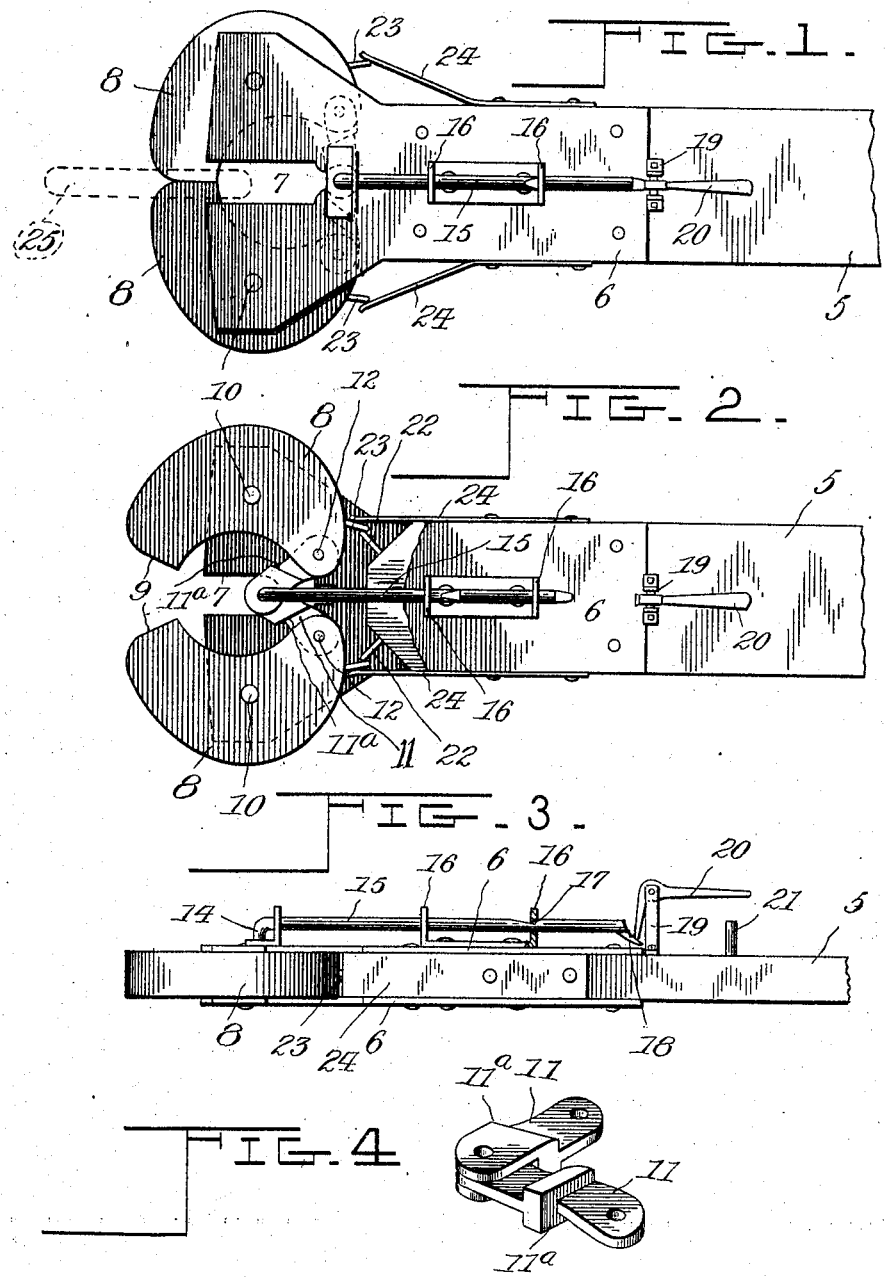
Witnesses:
Asahel E. Scouten, Inventor.
By Marion & Marion
Attorneys.

UNITED STATES PATENT OFFICE.

ASAHEL EDWARD SCOUTEN, OF RIDING MOUNTAIN, CANADA.

COUPLING DEVICE.

No. 816,129.  Specification of Letters Patent.  Patented March 27, 1906.

Application filed April 29, 1905. Serial No. 258,056.

*To all whom it may concern:*

Be it known that I, ASAHEL EDWARD SCOUTEN, a subject of the King of England, residing at Riding Mountain, in the Province of Manitoba, Canada, have invented certain new and useful Improvements in Coupling Devices; and I do hereby declare that the following is a full, clear, and exact description of the invention, such as will enable others skilled in the art to which it appertains to make and use the same.

My invention relates to coupling devices, and particularly that class of coupling devices adapted for attaching agricultural implements to traction-engines.

The object of my invention is to provide a coupling which may be released when the full draft of the engine is being exerted against the coupling without the necessity of reversing the engine; and my invention consists of the construction, combination, and arrangement of parts as herein illustrated and described.

In the accompanying drawings, forming a part of this application, I have illustrated one embodiment of my invention, in which drawings similar reference characters designate corresponding parts, and in which—

Figure 1 is a top plan. Fig. 2 is a top plan with part of the casing hereinafter described broken away. Fig. 3 is a side elevation, and Fig. 4 is a fragmentary detail in perspective illustrating a toggle used in my invention.

Referring to the drawings, 5 designates the draft bar or pole of any common agricultural implement, on the upper and lower faces of which are secured the plates 6 6, forming a casing which projects beyond the forward end of the part 5, and which casing is provided with a central slot 7 at its extreme forward end. Disposed within the casing described, adjacent its outer end, are a pair of elliptical jaws 8, having their outer ends approximately square, as at 9, and having a pin or bolt 10 passed therethrough at a central point, whereby the jaws are pivotally connected to said casing.

Disposed intermediate of the rear ends of the jaws 8 is a toggle comprising the members 11, provided with the integral shoulders 11ª. These members 11 are pivotally connected to the rear ends of the jaws 8 in any suitable way, as by the pivot-pins 12, connecting the outer ends of said members 11 to said jaws. The inner ends of the members 11 are pivotally joined together by the bent outer end 14 of a rod 15, which rod is carried in a plurality of brackets 16 16 16, secured to the upper face of the casing 6, and which is provided with a shoulder 17 adjacent the rearmost bracket 16. At its rearmost end the rod 15 is provided with a cam-lug 18.

Adjacent the rear end of the rod 15 there is secured to the draft member 5 or to the casing 6 a bracket 19, on which is supported a bell-crank lever 20, one end of which is adapted to contact with the cam-lug 18 when the jaws are closed and the other end of which is adapted to rest on the stop 21, carried on the draft member 5, when the jaws are in open position.

The forward end of the draft member 5 is preferably beveled and is provided with stop members 22, against which the stop members 23 on the rear part of the jaws 8 are adapted to contact. The sides of the forward end of the draft member 5 are provided with the spring members 24, adapted to contact against the stop members 23 on the side opposite to the stop members 22.

In the operation of my invention, assuming that a traction-engine is attached to the link 25 (shown in outline in Fig. 1) and is moving toward the left-hand side of the drawings, in order to release the link 25 the right-hand end of the lever 20 is depressed. This movement causes its opposite end to contact with the cam-lug 18, which carries the right-hand end of the rod 15 downward, so that the shoulder 17 becomes disengaged from the opening in the bracket, and at the same time this movement of the lever 20 carries the rod forward or toward the left hand. This forward movement of the rod 15 actuates the members 11 of the toggle to the position shown in Fig. 2, carrying the outer ends of the jaws 8 apart, so that the link 25 may be readily withdrawn. In this operation of uncoupling, the spring members 24, bearing on the stop members 23, secured on the jaws, help to overcome the dead-center of the toggle. As the uncoupling operation is completed the stop members 23 on the jaws 8 contact against the rigid stop members 22, carried by the draft member 5, and prevent the outward movement of the jaws to a point where they would cause the rod 15 to jam against the brackets 16. The reverse of the uncoupling operation is accomplished by inserting the link 25 between the jaws 8 and retracting the rod 15 until the parts assume the position shown in Figs. 1 and 3, when the members 11 of the toggle are past their central pivotal point and will exert an outward pressure on the inner ends of the jaws 8, so that the outer ends 9 are brought into contact. Tension exerted by draft on the link 25 will then tend to bring said outer ends close together. After the link 25 has been inserted and the rod 15 partly retracted the tension of the spring members 24 may be overcome by backing the engine or other draft appliance against the outer ends of the jaws, when the rod can be fully retracted and the shoulder 17 will engage the rear surface of the rearmost bracket 16, thereby effectively locking the rod against forward movement. It will be understood that when the parts are in the position shown in Figs. 1 and 3 the shoulders 11ª of the toggle members 11 will be in contact with the rear ends of the jaws 8, thereby tending to lock the parts in position.

Having thus fully described my invention, what I claim as new, and desire to secure by Letters Patent, is—

1. The combination comprising a draft-bar, a casing on the draft-bar, a pair of oppositely-disposed jaws pivoted to the casing, a toggle pivoted to the jaws and constructed to actuate said jaws and lock them in a predetermined position, means for locking the toggle, and means for unlocking the toggle.

2. The combination comprising a draft-bar, a casing on the draft-bar, a pair of oppositely-disposed jaws pivoted to the casing, means pivoted to the jaws and constructed to actuate the jaws and lock them in a predetermined position, a rod connected to said means, a plurality of brackets secured to the casing and adapted to support said rod, the said rod being provided with a shoulder adapted to engage one of said brackets, whereby the rod is locked in position, and means for unlocking the rod.

3. The combination comprising a draft-bar, a casing on the draft-bar, a pair of oppositely-disposed jaws pivoted to the casing, means pivoted to the jaws and constructed to actuate and lock said jaws in a predetermined position, a rod connected at one end with said means and provided at its opposite end with a cam-lug, means for locking the rod in a predetermined position, a lever pivoted to the draft-bar and adapted to engage said cam-lug and release said rod from its locked position.

4. The combination comprising a draft-bar, a casing on the draft-bar, a pair of oppositely-disposed jaws pivoted to the casing, resilient means for actuating and locking said jaws, means tending to keep said jaws open, means for locking said actuating means, and means for unlocking said actuating means.

5. The combination comprising a draft-bar, a casing on the draft-bar, a pair of oppositely-disposed jaws pivoted to the casing, means for actuating and locking said jaws, springs tending to keep said jaws open, means for locking said actuating means and means for unlocking said actuating means.

6. The combination comprising a draft-bar, a casing secured thereon, a pair of oppositely-disposed jaws pivoted to the casing, means for actuating and locking said jaws, a projection on each of the jaws, a spring secured on each side of the draft-bar and constructed to contact with said projections, means for locking the actuating means, and means for unlocking the actuating means.

7. The combination comprising a draft-bar, a casing on the draft-bar, a pair of oppositely-disposed jaws pivoted to the casing, means for actuating and locking the jaws, means for limiting the movement of the jaws in one direction, resilient means tending to force said jaws in an opposite direction, and means for locking and unlocking the actuating means.

8. The combination comprising a draft-bar, a casing on the draft-bar, a pair of oppositely-disposed jaws pivoted to the casing, means for actuating and locking the jaws, means for locking and unlocking the actuating means, and means for limiting the movement of the jaws in one direction, comprising a plurality of stops on the draft means and a stop on each of the jaws.

In witness whereof I have hereunto set my hand in the presence of two witnesses.

ASAHEL EDWARD SCOUTEN.

Witnesses:
JOHN WEMYSS,
M. KERR-MACKAY.